United States Patent
Ries et al.

(10) Patent No.: US 10,486,655 B2
(45) Date of Patent: Nov. 26, 2019

(54) TRANSMISSION AND METHOD OF ENGAGEMENT

(71) Applicant: Ford Global Technologies, LLC, Dearborn, MI (US)

(72) Inventors: Scott Patrick Ries, South Lyon, MI (US); Kendrick Morrison, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/108,500

(22) Filed: Aug. 22, 2018

(65) Prior Publication Data

US 2018/0354472 A1  Dec. 13, 2018

Related U.S. Application Data

(62) Division of application No. 14/174,181, filed on Feb. 6, 2014, now Pat. No. 10,093,287.

(51) Int. Cl.

| F16H 61/00 | (2006.01) |
|---|---|
| B60T 1/06 | (2006.01) |
| B60T 13/66 | (2006.01) |
| B60W 10/10 | (2012.01) |
| B60W 10/18 | (2012.01) |

(52) U.S. Cl.
CPC ............ *B60T 1/062* (2013.01); *B60T 13/662* (2013.01); *B60W 10/10* (2013.01); *B60W 10/182* (2013.01); *F16H 61/0059* (2013.01)

(58) Field of Classification Search
CPC .... B60T 1/062; B60T 13/662; B60W 10/182; B60W 10/10; F16H 61/0059
See application file for complete search history.

(56) References Cited

U.S. PATENT DOCUMENTS

| 5,334,114 | A | 8/1994 | Ando et al. |
|---|---|---|---|
| 5,439,088 | A | 8/1995 | Michioka et al. |
| 5,741,202 | A | 4/1998 | Huber |
| 5,984,828 | A | 11/1999 | Huber |
| 6,183,389 | B1 | 2/2001 | Tabata |
| 6,317,665 | B1 | 11/2001 | Tabata et al. |
| 7,204,785 | B2 * | 4/2007 | Berger ................ B60W 10/113 192/219.5 |
| 2009/0280953 | A1 | 11/2009 | Nishimine et al. |
| 2011/0297505 | A1 * | 12/2011 | Heuver ............... B60W 10/115 192/219.5 |
| 2012/0252631 | A1 * | 10/2012 | Saji ........................ F16H 61/12 477/115 |
| 2012/0283066 | A1 | 11/2012 | Nakade et al. |

(Continued)

*Primary Examiner* — David J Hlavka
(74) *Attorney, Agent, or Firm* — David Kelley; Brooks Kushman, P.C.

(57) ABSTRACT

While a transmission range selector is in a Park position, a controller engages multiple transmission shift elements to place the transmission in a tie-up state. In the tie-up state, both the transmission output shaft and the turbine shaft are held against rotation by the shift elements. To transition from Park to Drive, the controller releases one of the shift elements to place the transmission in a 1st gear state. To transition from Park to Reverse, the controller releases a different one of the shift elements to place the transmission in a reverse state. The controller may wait until the driver releases the brake pedal to release the shift element.

14 Claims, 4 Drawing Sheets

(56) References Cited

U.S. PATENT DOCUMENTS

| | | |
|---|---|---|
| 2013/0110364 A1 | 5/2013 | Yamada et al. |
| 2013/0145886 A1 | 6/2013 | Lee et al. |
| 2013/0151092 A1 | 6/2013 | Spaulding et al. |
| 2015/0323100 A1* | 11/2015 | Shinoda .................... F16F 7/12 29/450 |
| 2016/0265630 A1* | 9/2016 | Iwase ...................... B60T 1/062 |
| 2016/0325752 A1* | 11/2016 | Ono ....................... B60K 6/383 |

* cited by examiner

TRANSMISSION AND METHOD OF ENGAGEMENT

CROSS-REFERENCE TO RELATED APPLICATIONS

This application is a division of U.S. application Ser. No. 14/174,181 filed Feb. 6, 2014, now U.S. Pat. No. 10,093,287, issued on Oct. 9, 2018, the disclosure of which is hereby incorporated in its entirety by reference herein.

TECHNICAL FIELD

The present disclosure relates to the field of controls of automatic transmissions. In particular, it relates to a method of controlling transmission shift elements as a shift selector is moved among Park, Reverse, Neutral, and Drive positions.

BACKGROUND

Many vehicles utilize automatic transmissions to transmit power from an internal combustion engine to the vehicle wheels. The automatic transmission adjusts the speed ratio between the engine and the wheels such that the engine can run at an efficient speed as the vehicle speed varies. At low vehicle speed, the transmission causes the wheels to rotate much slower than the engine while delivering a multiple of the engine torque to the wheels. At high speed, the transmission permits the engine to run at a relatively low speed even as the wheels rotate relatively fast. In reverse, the transmission delivers torque in the opposite direction causing the vehicle to move backwards even as the engine continues to rotate in the same direction.

The driver controls the transmission mode by manipulating a range selector. Range selectors typically provide Park, Reverse, Neutral, and Drive modes. In Park mode, the vehicle is held stationary even in the presence of substantial force. This is conventionally implemented by placing the transmission gearbox in a neutral state and holding the output shaft stationary with a parking pawl. In Reverse, the vehicle moves backward when the driver presses the accelerator pedal. In Neutral, pressing the accelerator pedal does not cause the vehicle to move although the vehicle is allowed to move in response to other forces such as gravity. Finally, in Drive, the vehicle moves forward when the driver presses the accelerator pedal. Reverse, Neutral, and Drive are conventionally implemented by placing the gearbox in a corresponding state with the parking pawl released.

When a driver moves the range selector from Park to Reverse or Drive. The gearbox must transition from a neutral state to a reverse gear ratio or a 1st gear ratio, respectively. In many automatic transmissions, this is accomplished by engaging one or more shift elements. Unfortunately, there may be a delay between the time the transmission begins engaging a shift element and the time at which the shift element reaches the required torque capacity to establish the reverse gear ratio or 1st gear ratio. The delay may be longer when the engine is running slowly. During this interval, the transmission is in neutral even though the driver has selected Reverse or Drive. If the driver presses the accelerator pedal during this interval, the engine speed will increase without causing the vehicle to move. If the vehicle is on a hill, it will begin to roll down the hill. Then, when the transmission finishes the engagement, the vehicle may lurch suddenly in the selected direction. If the driver is holding the brakes as the transmission finishes the engagement, the powertrain will begin to exert force against the brakes and the vehicle occupants may notice a jolt from the reaction torque at the transmission mounts.

SUMMARY

An automatic transmission includes a plurality of shift elements. A first shift element is engaged in Park and in a forward launch mode and is disengaged in a reverse launch mode. A second shift element is engaged in Park and in the reverse launch mode and is disengaged in the forward launch mode. The transmission may include a controller that releases the first clutch to transition from Park to Reverse and releases the second clutch to transition from Park to Drive. Some embodiments may include one or more additional shift elements that are engaged in Park, the forward launch mode, and the reverse launch mode. While in Park, these shift elements hold both a transmission output shaft and a turbine shaft against rotation.

A method of operating a transmission includes engaging sufficient shift elements to hold an output shaft and a turbine shaft against rotation and then transitioning from Park to a non-Park mode by disengaging a parking pawl and disengaging one of the shift elements. The non-Park mode may be, for example, a Reverse mode, a Drive mode, or a Neutral mode. The disengagement of the parking pawl may precede the disengagement of the shift element. The disengagement of the shift element may be delayed until the drive also released a brake pedal. Engagement of the shift elements may be sequenced to avoid temporarily establishing a power flow path from the turbine shaft to the output shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
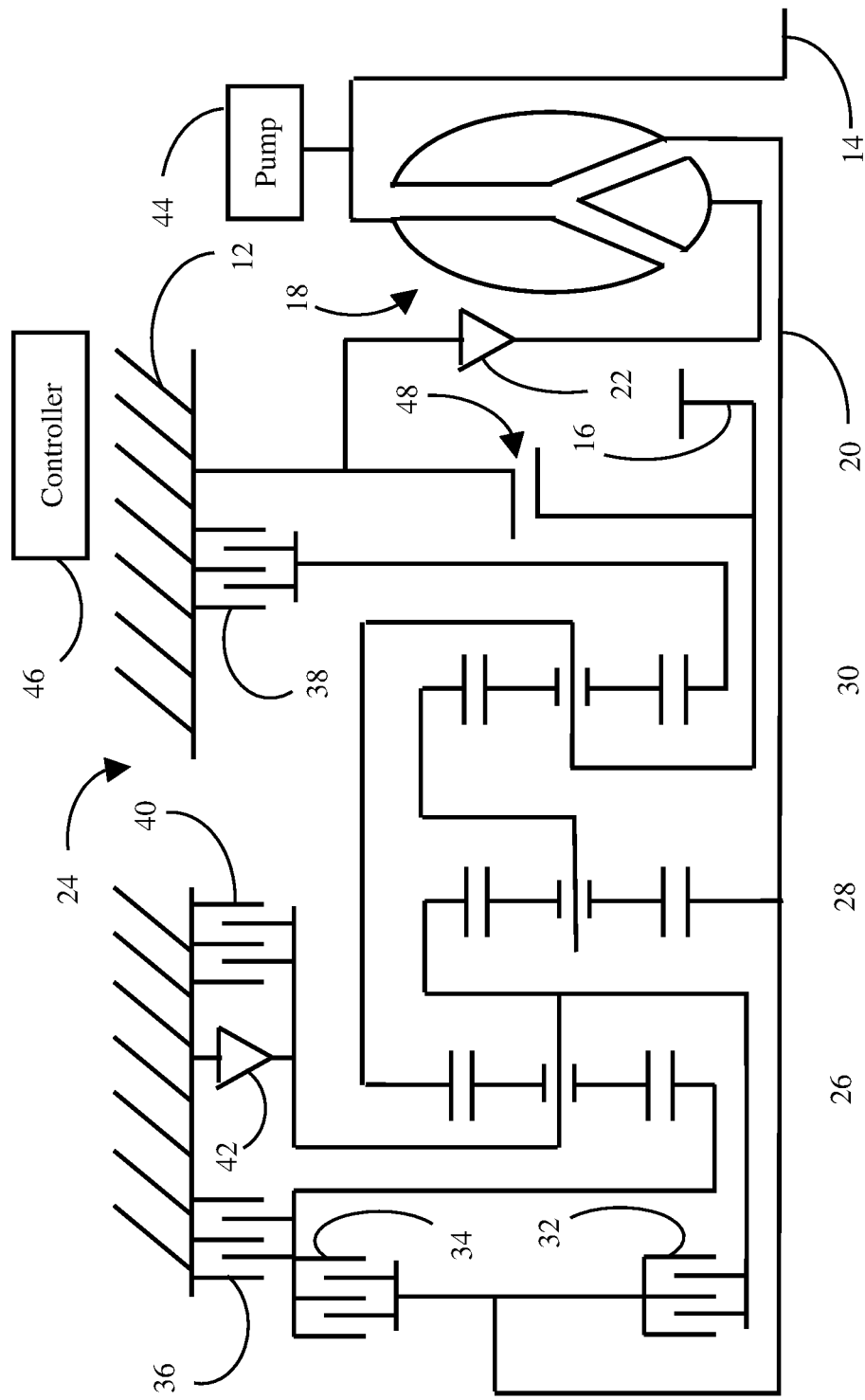
FIG. 1 is a schematic representation of a first exemplary transmission configuration.

FIG. 1 illustrates a representative automatic transmission. The transmission is contained in a housing 12 that is fixed to vehicle structure. An input shaft 14 is driven by the vehicle engine. An output element 16 drives vehicle wheels. A torque converter 18 has an impeller fixed to input shaft 14 and a turbine fixed to turbine shaft 20. Torque converter 18 transmits torque from input shaft 14 to turbine shaft 20 while permitting turbine shaft 20 to rotate slower than input shaft 14. When turbine shaft 20 rotates substantially slower than input shaft 14, the torque converter stator is held against rotation by one way clutch 22 such that the torque applied to turbine shaft 20 is a multiple of the torque supplied at input shaft 14. Alternatively, torque converter 18 could be replaced by a launch clutch.

Gear box 24 establishes a number of speed ratios between turbine shaft 20 and output element 16. Specifically, gear box 24 has three planetary gear sets and five shift elements that establish six forward and one reverse speed ratio. Simple planetary gear sets 26, 28, and 30 each have a sun gear, a carrier, and a ring gear that rotate about a common axis. Each planetary gear set also includes a number of planet gears that rotate with respect to the carrier and mesh with both the sun gear and the ring gear. The carrier of gear set 26 is fixedly coupled to the ring gear of gear set 28. The carrier of gear set 28 is fixedly coupled the ring gear of gear set 30. The ring gear of gear set 26 is fixedly coupled to the carrier of gear set 30 and to output element 16. Finally, the sun gear of gear set 28 is fixedly coupled to turbine shaft 20.

The various speed ratios are established by engaging various combinations of shift elements. A shift element that selectively holds a gear element against rotation may be called a brake whereas a shift element that selectively couples two rotating elements to one another may be called a clutch. Clutches 32 and 34 selectively couple turbine shaft 20 to the carrier and sun gear, respectively, of gear set 26. Brakes 36 and 38 selectively hold sun gears gear sets 26 and 30, respectively, against rotation. Brake 40 selectively holds the carrier of gear set 26 against rotation. Finally, one way clutch passively holds the carrier of gear set 26 against rotation in one direction while allowing rotation in the opposite direction. Table 1 illustrates which shift elements are engaged to establish each speed ratio.

TABLE 1

|  | 32 | 34 | 36 | 38 | 40/42 | Ratio | Step |
|---|---|---|---|---|---|---|---|
| Reverse |  | X |  |  | X | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift elements 32-40 may be hydraulically actuated multi-plate wet friction clutches or brakes. Engine driven pump 44 pressurizes hydraulic fluid. Controller 46 selectively routes the pressurized fluid to the shift elements to be engaged. This may be accomplished by controlling valves in a valve body to alternately connect each shift element either to the high pressure supply or to a vent. In some embodiments, the controller may adjust the current to one or more variable force solenoids to control the pressure supplied to each clutch. When the engine is not running, the pump does not supply pressurized fluid so all of the shift elements are disengaged. When pressurized fluid is first supplied to a shift element, it moves a piston into a stroked position. Then, the fluid forces plates together so that the shift element can transmit torque. The torque capacity is negligible until the piston reaches the stroked position. When the pressure is relieved, the torque capacity rapidly drops to near zero and then the piston continues to move to a released (not stroked) position.

When the range selector is in the Park position, a parking pawl 48 is engaged which holds output element 16 against rotation with respect to the housing 12. The parking pawl 48 is designed to remain engaged when the engine is not running. A variety of parking pawl designs are known in the industry. Although the parking pawl is typically located within the transmission case, other vehicle locations are possible. The parking pawl may be mechanically linked to the range selector. In other embodiments, controller 46 may control the engagement and disengagement of parking pawl 48 in response to movement of the range selector.

Figure 2:
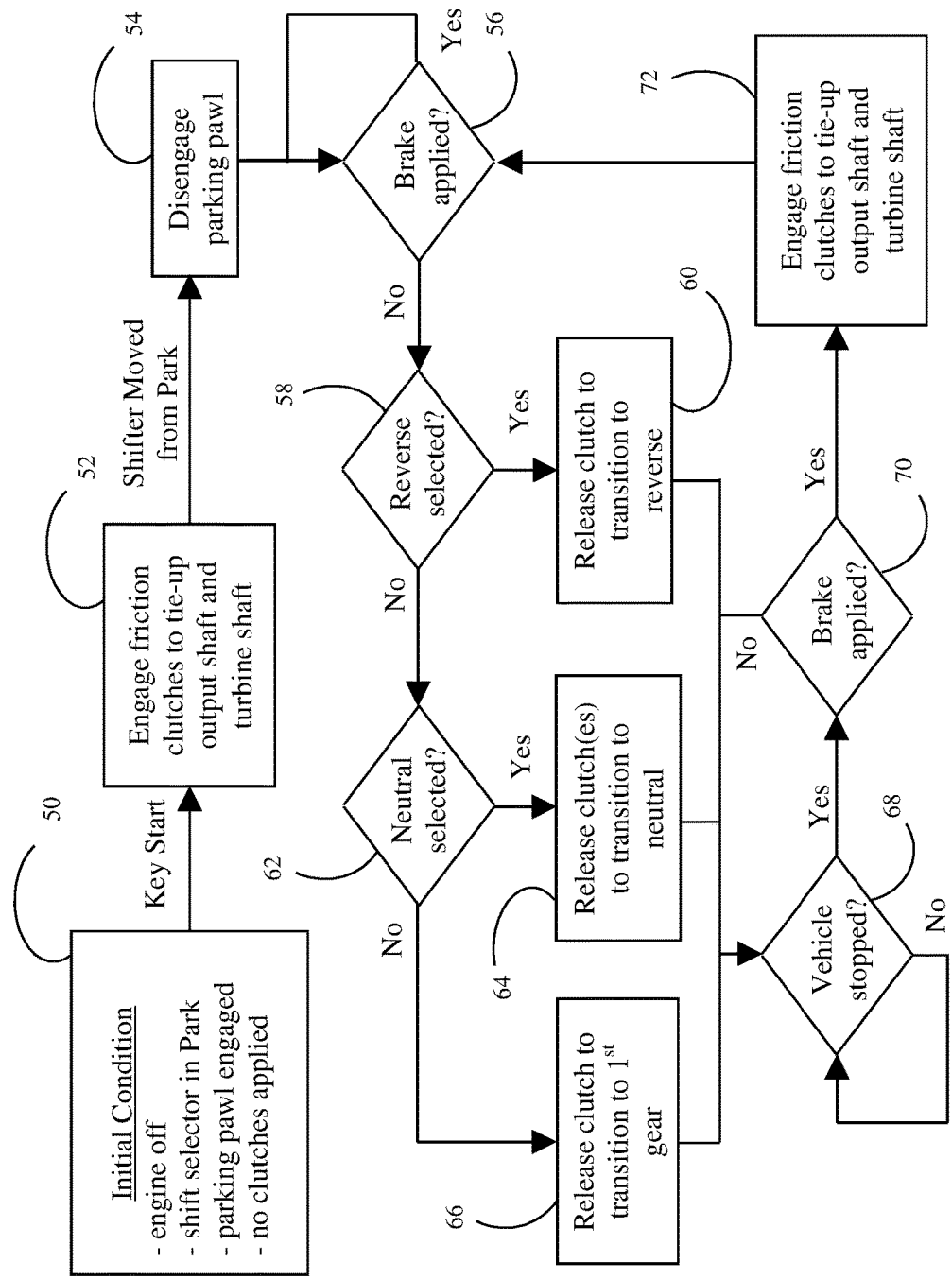
FIG. 2 is a flow chart illustrating a method of engaging and releasing shift elements in response to movement of a shift selector and actuation of a brake pedal.

FIG. 2 illustrates how the shift elements of a transmission such as the transmission illustrated in FIG. 1 are controlled to improve transitions from Park to Drive, Reverse, or Neutral. At shown at 50, the vehicle is initially in a condition in which the engine is off, the shift selector is in the Park position, and the vehicle is held stationary by parking pawl 48. At 52, when the engine is started, the controller engages clutch 34 and brakes 38 and 40. This places gear box 24 in a tie-up state as opposed to a neutral state. In other words, both turbine shaft 20 and output element 16 are held against rotation. At 54, when the driver moves the range selector to a non-Park position, such as Drive, Reverse, or Neutral, parking pawl 48 is disengaged. Because the shift elements continue to hold the output shaft stationary, the vehicle does not move forward or backwards when the parking pawls is released and the reaction torque at the transmission mounts does not change. To avoid unintentional transitions from Park, the vehicle may have an interlock mechanism that prevents moving the shifter from Park when the brake pedal is not depressed.

The controller then waits at 56 until the brake pedal is released. When the brake pedal is released, the controller releases one or more shift elements depending on the state of the shift selector. For example, if the shift selector is in the Reverse position at 58, the controller releases brake 38 at 60 to place the transmission in reverse. The delay between commanding a disengagement and the torque capacity falling to near zero is much shorter than the time delay associated with engagement. Therefore, the transmission reaches the reverse state much sooner than it would if it were transitioning from a neutral state. Similarly, if the shift selector is in the Neutral position at 62, the controller releases two shift elements at 64 to place the transmission in neutral. Finally, if the shift selector is in the Drive or Low position, the controller disengages clutch 34, placing the gear box in 1st gear. In some embodiments, the controller may release clutches to transition to the selected transmission state without waiting for release of the brake pedal. When the vehicle stops with the brakes applied, as determined at 68 and 70, the controller engages additional clutches at 72 and returns to the waiting state 56. In this way, transitions between Drive and Reverse are also improved by going through an intermediate tie-up state.

Figure 3:
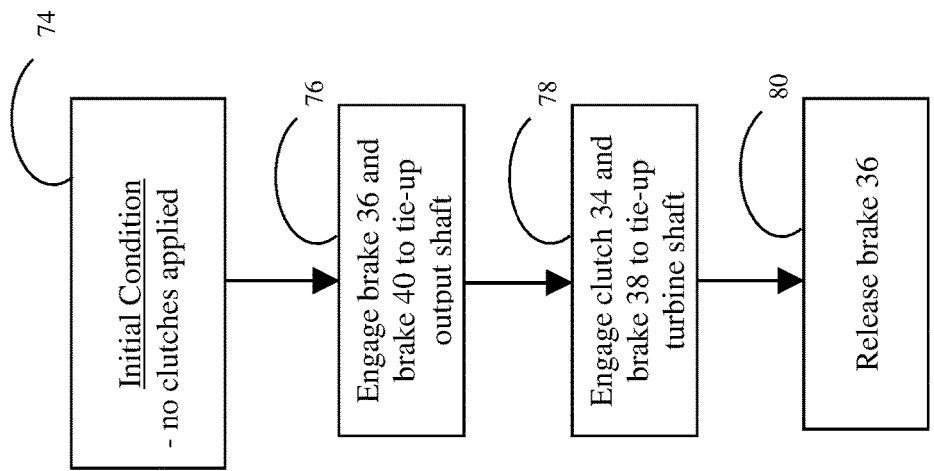
FIG. 3 is a flow chart illustrating a sequence of shift element engagement for the shift elements of the transmission of FIG. 1.

As shift elements 34, 38, and 40 are engaged, the gearbox may transition briefly through a reverse state or a 1st gear state before reaching the tie-up state. For example, if 34 and 40 are applied while 38 is still being stroked, then the gear box would be in reverse until 38 is engaged. This can be undesirable if the driver moves the shift lever to Drive during this interval because the vehicle would move backward (though only briefly) when the driver is expecting to move forward. To avoid this possibility, the controller may stage the engagement of the shift elements systematically to avoid transitioning through a reverse or forward gear state. The sequence will depend on the kinematic arrangement and the clutch application pattern. The process for gear box 24 is illustrated in FIG. 3. Engaging brakes 36 and 40 at 76 holds the output against rotation although the turbine shaft is still free to rotate. Once 36 and 40 are engaged, engaging clutch 34 and brake 38 at 78 holds the turbine shaft against rotation. Finally, brake 36 is released at 80.

Figure 4:
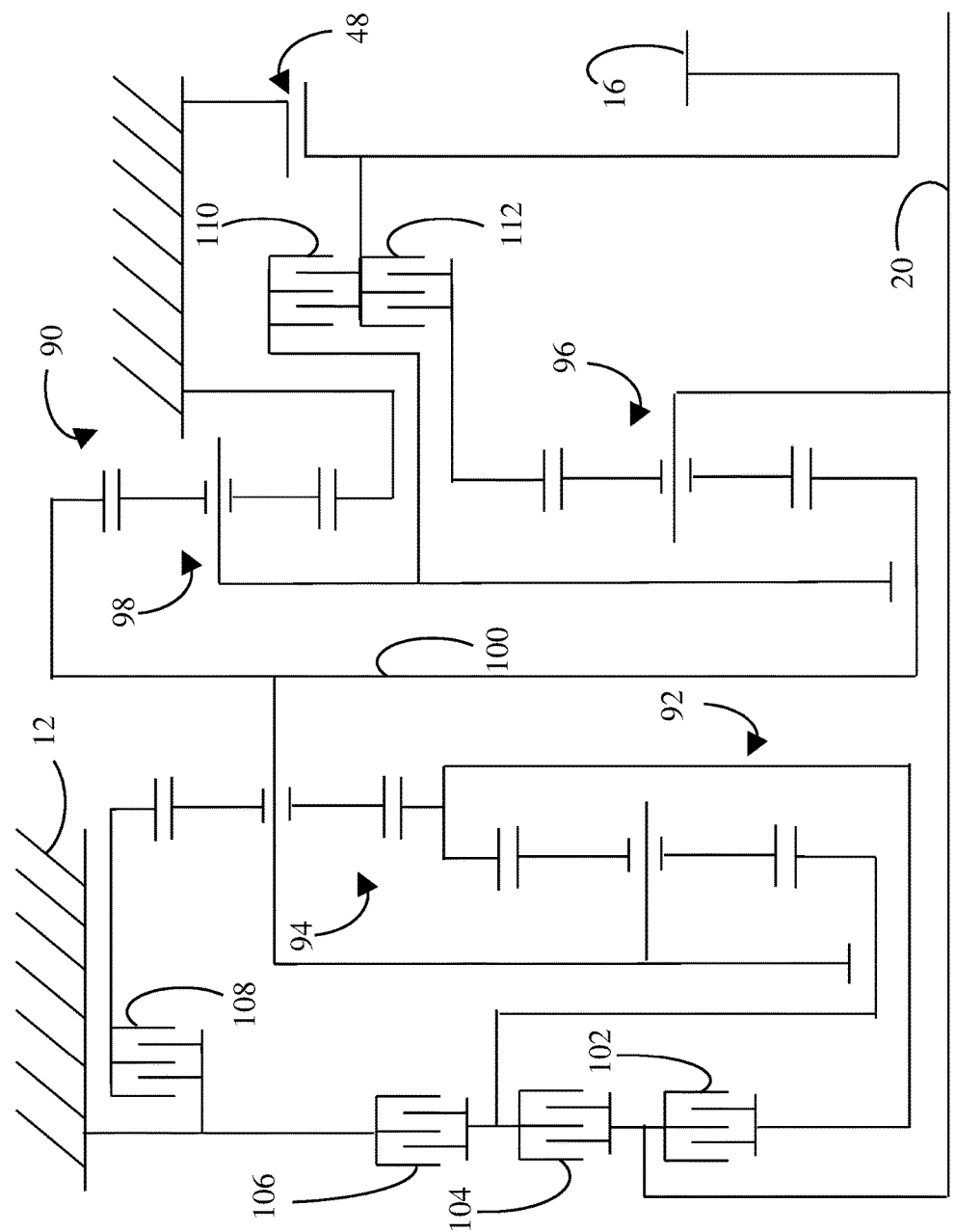
FIG. 4 is a schematic representation of a second exemplary transmission configuration.

FIG. 4 illustrates a different gear box arrangement. Gear box 90 establishes nine forward speed ratios and one reverse speed ratio between turbine shaft 20 and output element 16. Simple planetary gear sets 92, 94, 96, and 98 each have a sun gear, a carrier, and a ring gear that rotate about a common axis. Each planetary gear set also includes a number of planet gears that rotate with respect to the carrier and mesh with both the sun gear and the ring gear. The carriers of gear sets 92 and 94 are fixedly coupled to one another and form intermediate shaft 100. The sun gear of gear set 94 is fixedly coupled to the ring gear of gear set 92. Clutches 102 and 104 selectively couple turbine shaft 20 to the ring gear and sun gear, respectively, of gear set 92. Brakes 106 and 108 selectively hold sun gear of gear set 92 and the ring gear of gear set 94, respectively, against rotation. Engaging these four shift elements in combinations of two establishes a variety of speed ratios between turbine shaft 20 and intermediate shaft 100. Engaging clutch 104 and brake 108 cause intermediate shaft 1000 to rotate in the opposite direction of turbine shaft 20. Engaging brakes 106 and 108 hold intermediate shaft 100 stationary. Engaging clutch 102 with brake 106 or brake 108 cause intermediate shaft 100 to rotate slower than turbine shaft 20 at two different speed ratios. Finally, engaging clutches 102 and 104 cause intermediate shaft 100 to rotate at the same speed as turbine shaft 20.

Gear set 98 and clutch 110 selectively establish an underdrive speed relationship between intermediate shaft 100 and output element 16. Thus, engaging clutch 110 together with various combinations of two of shift elements 102-108 establish the reverse ratio and the three lowest forward ratios. Gear set 96 and clutch 112 selectively establish a linear speed relationship among intermediate shaft 100, turbine shaft 20, and output element 16. Thus, engaging clutch 112 together with various combinations of two of shift elements 102-108 establishes a direct drive ratio and four overdrive ratios. The remaining ratio is established by engaging clutches 110 and 112 together. Table 2 illustrates which shift elements are engaged to establish each speed ratio.

TABLE 2

| | 102 | 104 | 106 | 108 | 110 | 112 | Ratio | Step |
|---|---|---|---|---|---|---|---|---|
| Reverse | | X | | X | X | | −3.09 | 69% |
| 1st | X | | | X | X | | 4.47 | |
| 2nd | X | | X | | X | | 2.66 | 1.68 |
| 3rd | X | X | | | X | | 1.68 | 1.58 |
| 4th | (X) | | | X | | X | 1.23 | 1.36 |
| 5th | X | X | | | | X | 1.00 | 1.23 |
| 6th | X | | X | | | X | 0.84 | 1.19 |
| 7th | X | | | X | | X | 0.76 | 1.11 |
| 8th | | | X | X | | X | 0.66 | 1.15 |
| 9th | | X | | X | | X | 0.56 | 1.19 |

When the engine is started, the controller engages clutches 102 and 104 and brake 108 holding intermediate shaft 100 and turbine shaft 20 against rotation. Then, the controller engages clutch 110 which holds output element 16 stationary. This places gear box 90 in a tie-up state. When the driver moves the range selector to the Reverse position and releases the brake pedal, parking pawl 48 is disengaged and the controller releases clutch 102 to place gear box 90 in reverse. Similarly, when the driver moves the range selector to the Drive position and releases the brake pedal, the parking pawl is released and the controller disengages clutch 104, placing the gear box in 1st gear. Finally, if the driver moves the range selector to Neutral and release the brake pedal, the parking pawl is released and the controller releases clutch 110, placing the gear box in a neutral state.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a vehicle transmission comprising:
   while a park mode is selected and a parking pawl is engaged, engaging sufficient shift elements to hold a transmission output shaft and a turbine shaft against rotation with the parking pawl disengaged, wherein the shift element engagements are sequenced to avoid temporarily establishing a power flow path from the turbine shaft to the output shaft; and transitioning from the park mode to a non-park mode by disengaging the parking pawl and disengaging one of the shift elements.

2. The method of claim 1 wherein the non-park mode is a forward drive mode.

3. The method of claim 1 wherein the non-park mode is a reverse drive mode.

4. The method of claim 1 wherein the non-park mode is a neutral mode.

5. The method of claim 1 wherein the parking pawl is disengaged before the shift element is disengaged to transition to the non-park mode.

6. The method of claim 5 further comprising waiting for a brake pedal to be released before disengaging the shift element.

7. A transmission comprising:
a parking pawl;
an output shaft;
a turbine shaft;
a plurality of shift elements; and
a controller programmed to
while a park mode is selected and the parking pawl is engaged, engage a subset of the plurality of shift elements to hold the output shaft and the turbine shaft against rotation with the parking pawl disengaged, wherein the controller is further programmed to sequence shift element engagements to avoid temporarily establishing a power flow path from the turbine shaft to the output shaft; and
transition from the park mode to a non-park mode by disengaging the parking pawl and disengaging a shift element of the subset of the plurality of shift elements.

8. The transmission of claim 7 wherein the non-park mode is a forward drive mode.

9. The transmission of claim 7 wherein the non-park mode is a reverse drive mode.

10. The transmission of claim 7 wherein the non-park mode is a neutral mode.

11. The transmission of claim 7 wherein the controller is further programmed to disengage the parking pawl before disengaging the shift element when transitioning to the non-park mode.

12. The transmission of claim 11 wherein the controller is further programmed to wait for a brake pedal to be released before disengaging the shift element.

13. A vehicle comprising:
a transmission having a parking pawl, an output shaft, a turbine shaft, and a plurality of shift elements;
a brake pedal; and
a controller programmed to
while a park mode is selected and the parking pawl is engaged, engage a subset of the plurality of shift elements to hold the output shaft and the turbine shaft against rotation with the parking pawl disengaged; and
transition from the park mode to a non-park mode by first disengaging the parking pawl and subsequently disengaging a shift element of the subset of the plurality of shift elements and wherein the controller is further programmed to wait for the brake pedal to be released before disengaging the shift element.

14. The vehicle of claim 13 wherein the controller is further programmed to sequence shift element engagements to avoid temporarily establishing a power flow path from the turbine shaft to the output shaft.

* * * * *